May 16, 1967 J. D. MacKENZIE 3,320,043
METHOD FOR MAKING THIN FILM GLASS ELEMENTS
Original Filed Aug. 23, 1962
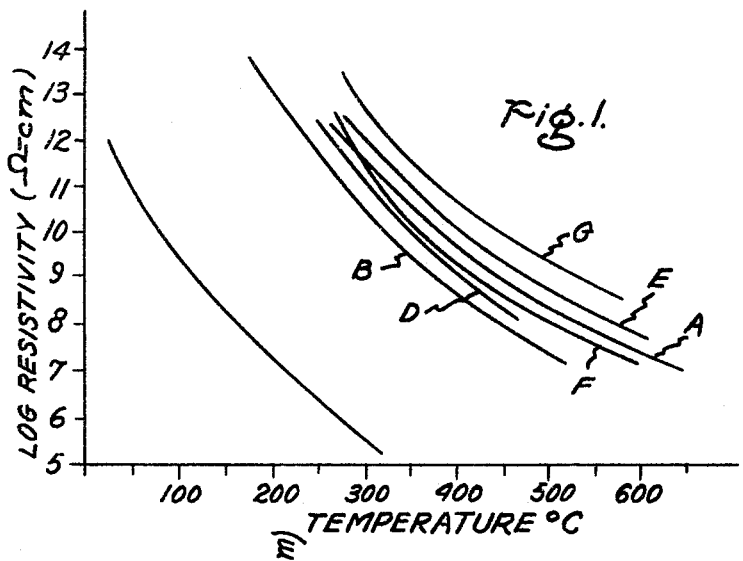
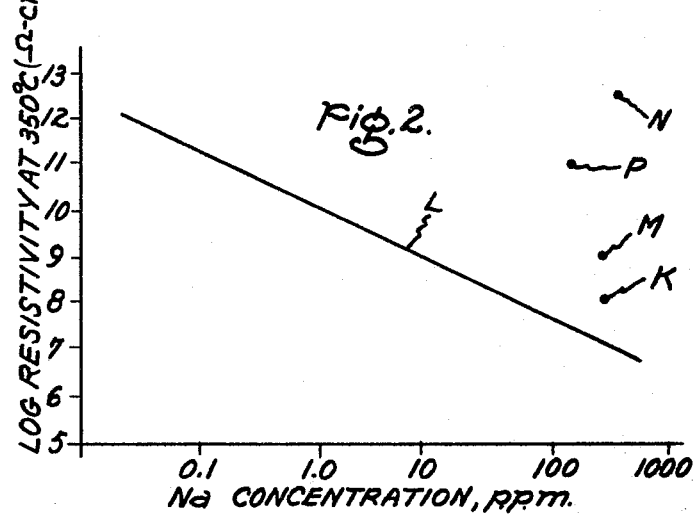
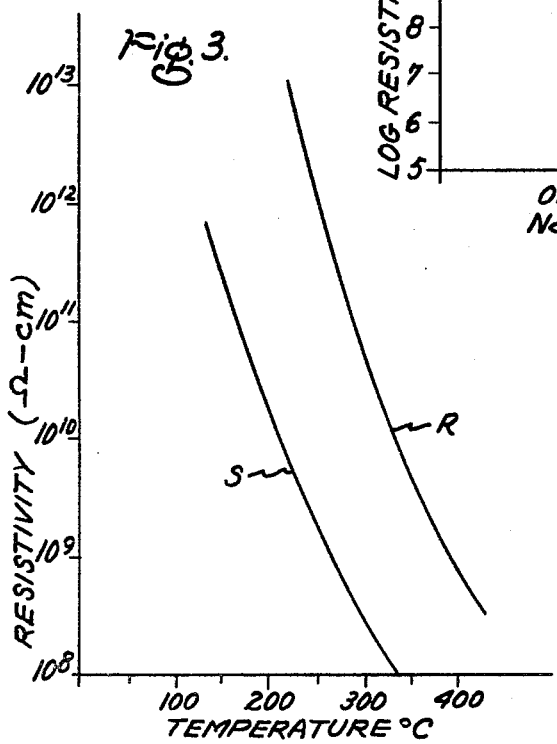
Inventor:
John D. Mackenzie,
by His Attorney

United States Patent Office 3,320,043
Patented May 16, 1967

3,320,043
METHOD FOR MAKING THIN FILM GLASS ELEMENTS
John D. MacKenzie, Schenectady, N.Y., assignor to General Electric Company, a corporation of New York
Original application Aug. 23, 1962, Ser. No. 219,045. Divided and this application Oct. 21, 1965, Ser. No. 499,267
2 Claims. (Cl. 65—21)

This is a division of my copending application (now abandoned) Ser. No. 219,045, filed Aug. 23, 1962, and assigned to the assignee hereof.

The present invention relates generally to the glass making art and is specifically concerned with a new method of making glass bodies and particularly sheets of glass having very high electrical resistance.

It has long been generally recognized that the discovery of a glass having electrical resistance approximating that of mica could have important scientific and commercial consequences. Thus, for lack of such a material, the art has had to compromise between mica, fused silica or quartz and the ordinary silicate or soda-lime glasses for a wide variety of uses and purposes. By virtue of my present invention, however, it is possible to produce bodies of germanate, phosphate and silicate glasses which will meet and satisfy requirements which previously compelled the foregoing compromises. It is, for example, possible and feasible through this invention to produce a thin film capacitor of silicate, phosphate or germanate glass having superior electrical characteristics coupled with heat stability and moisture resistance over a wide range of temperature and a prolonged period of time. The unique workability of these glasses permits easy production at relatively low temperatures of bodies or articles of predetermined sizes and shapes. Thus, while fused or vitreous quartz must be worked at temperatures of the order of 2000° C., the present glasses can readily be worked to form practically any desired shape at temperatures below 1000° C.

One of my discoveries underlying this invention in all its aspects is that silica ($SiO_2$), phosphorous pentoxide ($P_2O_5$), and germanium dioxide ($GeO_2$) can each be compounded with a secondary component in a certain critical manner and processed in a particular way to produce a glass body having properties and characteristics wholly different from silicate, phosphate and germanate glass bodies heretofore known. More specifically, I have found that contrary to expectations, the electrical resistivity and the viscosity and the hardness of these glasses increase as the content of the secondary component is increased. In addition, I have found that the secondary component must be present in substantial amount, i.e., from 30 to 60 mole percent if the new properties and characteristics of the products of these materials are to be consistently obtained. A further discovery is that the secondary component must be an alkaline earth metal oxide or mixture thereof and I have also found that calcium oxide, barium oxide, and strontium oxide are particularly efficacious. A miscibility discontinuity in portions of these systems imposes the necessity for a minor quantity of a third component in certain instances if a homogeneous product is to be obtained. Aluminum oxide, potassium oxide or one of the other oxides mentioned just above may be employed for this purpose.

Glasses prepared in accordance with the compositional and process requirements indicated above and subsequently to be described in detail are capable of being blown or drawn out or pressed or otherwise extended to produce membrane-like bodies suitable for use, for example, in thin film capacitors. Because of viscosity characteristics of glasses of this invention under relatively broad temperature ranges, bubbles may be blown in the course of producing thin glass films of the required dimensions for a variety of uses. Sections cut from large bubbles of this glass will normally be of thickness within a fairly broad and readily controlled range related to the bubble size and will be of flatness adequate to a number of different purposes, but in any case may easily be flattened in a warm pressing operation. The homogeneity of these glasses is readily estabished in accordance with the present new process and consequently sections cut from large bubbles will consistently be substantially uniform throughout in electrical and physical characteristics.

In accordance with this invention, a polycomponent silicate, phosphate or germanate glass having a room-temperature electrical resistivity of at least $10^{18}$ ohm-cm. is employed. The silicate and phosphate glasses used have resistivity values substantially greater than that of fused silica over the range of temperature from room temperature to more than 500° C. The germanate glasses have resistivity values more than two orders of magnitude higher than ordinary $GeO_2$ glass over the range from 200° C. to 450° C. The dielectric constant of this glass at room temperature is 16.5 and increases slowly to 17.5 at 320° C., while between room temperature and 300° C. the loss factor, tan δ, is less than $10^{-3}$ for a frequency of 10 kc. The glasses used in this process all have in common an alkaline earth metal oxide component in an amount between 30 and 60 mole percent of the total glass composition.

The method of this invention, generally stated, comprises the steps of producing a glass in which the network former is $P_2O_5$, $GeO_2$ or $SiO_2$ and the network modifier is present in the glass in an amount of from 30 to 60 mole percent, then forming a sheet of this glass of desired thickness from one-half mil to one-half inch. In a preferred practice, phosphoric acid or finely-divided silica or germanium dioxide and from 30 to 60 mole percent of an alkaline earth metal oxide or its carbonate equivalent are mixed together and the resulting substantially dry and homogeneous mixture is heated to react the glass network former with the carbonate or oxide to produce a high resistivity glass. Subsequently, a bubble of this glass is formed and finally a portion of the glass bubble is selected and shaped to predetermined form.

Those skilled in the art will gain a further and better understanding of the present invention from the detailed description set forth below taken in conjunction with the drawings accompanying and forming a part of this specification, in which:

FIG. 1 is a chart bearing curves illustrating electrical resistivity data obtained in tests of a variety of glasses and including silicate glasses having utility in the present invention;

FIG. 2 is another chart comparing resistivity data obtained for several sodium-containing glasses of this invention with each other and with values for fused silica containing various amounts of sodium; and FIG. 3 is still another chart bearing curves comparing the resistivity over a range of temperatures of fused $GeO_2$ and a barium oxide-germanate glass useful in this invention.

As indicated above, the materials used in this invention method are polycomponent glasses in that they contain at least one component in addition to silicate, phosphate or germanate. Furthermore, the secondary component must be an alkaline earth metal oxide. Also, as indicated above, this secondary constituent must be present in an amount of from 30 to 60 mole percent of the glass body or mass and it must serve as a so-called "glass network modifier" as distinuished from a so-called "glass network former." These glasses thus are composed of a network former in the form of silicate, phosphate or ermanate and a network modifier which may be calcium xide, barium oxide, strontium oxide, magnesium oxide r a mixture of two or more of these oxides. Still further, where it is necessary to production of a homogeneous ody to overcome the immiscibility of the network modifier in the network former, an additional component such s aluminum oxide or potassium oxide is employed as art of the secondary constituent of the composition. The miscibility promoting additive may be suitably employed n an amount ranging from about one mole percent to ive mole percent of the ultimate glass composition and t may be incorporated in the raw mixture of oxides preparatory to the heating step. Alternatively, it may be added when the basic components of the glass are in the liquid state.

The amount or proportion of the secondary constituent of these glass compositions is highly critical to the consistent production of glass sheet products having the unique properties of this invention. If the secondary constituent content of the entire composition is less than 30 mole percent, one or another or all of the special desirable properties of these products will be significantly impaired or even destroyed. On the other hand, if the secondary constituent aggregates more than 60 mole percent of the ultimate network former-network modifier composition, one or more of these same properties will be again adversely affected to an important extent. It will be understood, however, that other materials may be added to the basic glass consisting of the network former and network modifier components to obtain special effects or results. These additives, however, do not constitute the basis upon which the critical 30–60 mole percent range of the secondary constituent is calculated. Further, the use of such additives and the amounts employed will depend upon the specific properties desired in a given case and the effects which relatively large amounts of optional additives have upon the desired physical and electrical properties of the glass products.

Bodies of these glasses of various dimensions and shapes may be produced for a variety of uses. I have, for example, produced membrane-like glass bodies suitable for use as thin film electrical capacitors and I have also succeeded in producing glass plates, sheets, and strips of thickness approaching ½ inch. The thickness limitation at the upper end of the range is set by practical considerations while that at the lower end of the range is fixed by the use to be made of such materials. Because of the close similarity between these new glasses and micas in respect to their dielectrical strengths, I have produced sheets of these glasses ranging in thickness from ½ mil to 15 mils to test their suitability as a mica-substitute for a variety of electrical applications. On the basis of these tests, I have been able to establish that over the full thickness range of micas in general use, these glass products can perform the same functions and produce the same results as micas. However, because of the ease of production of homogeneous bodies of uniform predetermined thickness and any desired size and the ability to control the dielectric strengths and other important properties of these glass products, they may be preferred to micas for many commercial uses.

The following illustrative, but not limiting, examples of this invention method in the preparation of my glass products are offered in the interest of further apprising those skilled in the art as to representative details and specific data.

*Example I*

Reagent grade calcium carbonate and powdered quartz are mixed together in proportions corresponding to 40 mole percent of calcium oxide and 60 mole percent of silica, and then heated in air in a platinum crucible. Heating continued for one hour with the temperature being maintained at 1600° C. and the mixture therefore in a molten state. The resulting glass has a resistivity of $10^{20}$ ohm-cm. at room temperature and resistivity over several hundred degrees centigrade as indicated by curve A of FIG. 1. By way of comparison, curve B of FIG. 1 represents the resistivity characteristics of fused silica containing less than one-twentieth as much sodium, while curve C depicts the characteristics of a soda-lime silicate glass containing 17 weight percent $Na_2O$.

*Example II*

In a repetition of the Example I experiment, a mixture of equal parts of CaO and $SiO_2$ was prepared and the resistivity of this glass over the same broad temperature range was determined and plotted as curve D of FIG. 1.

*Example III*

Curve E of FIG. 1 represents the resistivity of still another glass prepared, in general, according to the procedure set forth in Example I. In this case, however, barium carbonate and silicic acid (both of reagent grade) were used in proportions leading to the formation of a 30 mole percent BaO–70 mole percent $SiO_2$ glass on heating in air for 1450° C. for one hour. This glass contained approximately 10 times more sodium than did the fused silica of curve B.

*Example IV*

Melting a mixture of 48 mole percent MgO and 52 mole percent $SiO_2$ (both reagent grade) at 1600° C. and holding at that temperature for an hour in an air atmosphere, as described in Example I, lead to the formation of a glass, the resistivity characteristics of which are illustrated by curve F of FIG. 1. The sodium content of this glass was likewise 10 times greater than that of the curve B material.

*Example V*

Using reagent grade $MgCO_3$, $CaCO_3$ and $SiO_2$ (as silica sand), another of these new glasses was produced having the resistivity-temperature properties depicted by curve G of FIG. 1. This glass was composed of 50 mole percent $SiO_2$ and 25 mole percent of each CaO and MgO and had a sodium content amounting to about 10 times that of the curve B fused silica.

*Example VI*

A mixture of calcium carbonate and phosphoric acid was melted in air in an open platinum crucible and maintained at 1450°C. for one hour. With the resulting mass in the molten state, a stream of dry nitrogen (dew point −40° C.) was bubbled through it for 30 minutes to drive off the last traces of moisture and then melt was cast. Analysis of the resulting glass established its composition as 33 mole percent CaO and 67 mole percent $P_2O_5$ with about 500 parts per million of sodium. The resistivity of this glass at 350° C. is indicated at K on the chart of FIG. 2 where the log of resistivity at 350° C. is plotted against sodium concentration in p.p.m. for fused silica (curve L) and for the glass of Example VII (point M) and the glass of Example II of my copending application, Ser. No. 128,447 (point N), and a calcium silicate glass of this invention having the composition $CaO \cdot 1.5SiO_2$ (point P).

*Example VII*

This glass, as indicated in Example VI, is similar to the glass of Example VI and was prepared in the same manner, its different electrical resistivity being attributable to its different composition. Actually, this glass is composed of equal parts of glass network former and glass network modifier, viz. 50 mole percent $P_2O_5$ and 50 mole percent CaO and about 500 p.p.m. of sodium ion. Also, as in the case of Example VI, the extrapolated electrical resistivity of this glass at room temperature is greater than $10^{18}$ ohm-cm.

Example VIII

A germanate glass was made according to the foregoing procedure by mixing barium carbonate and germanium dioxide powders and melting the resulting mixture in a platinum crucible in air and maintaining its temperature at 1300° C. for one hour and then casting and cooling the mass. This glass had a composition approximating 39 mole percent BaO and 61 mole percent $GeO_2$ and an electrical resistivity characteristic illustrated by curve R of FIG. 3. Curve S represents the electrical resistivity of $GeO_2$ (fused) over the same temperature range and it is seen that while the impurity levels of these two materials are the same (reagent grade $GeO_2$ and barium carbonate being used throughout), the resistivity of the new glass is more than two orders of magnitude greater than that of the $GeO_2$ over the range from 200° C. to 450° C. and the extrapolated resistivity of the glass at room temperature is greater than $10^{20}$ ohm-cm. The dielectric constant of this glass at room temperature is 16.5 and increases slowly to 17.5 at 320° C. while the loss factor, tan δ, is less than $10^{-3}$ for a frequency of 10 kc. As in the prior examples, the specimens were prepared for test and tested in accordance with the procedures described in said copending application, Ser. No. 128,447.

As generally indicated above, products of these glasses may contain substances in addition to the glass network former and the glass network modifier. Thus, in the case of magnesium silicates, magnesium phosphates and magnesium germanates, it is essential that an amount of a miscibility promoting agent be present. This is the case also for certain calcium silicate, phosphate and germanate glasses of this invention, specifically those containing less than 27 mole percent of CaO. In any event, however, from one mole percent to five mole percent of this agent is sufficient for this purpose and the use of a substantially larger amount can impair the desired properties of these new products. The use of this agent is necessary when the amount of the glass network modifier is less than the amount stated below:

| | Mole percent |
|---|---|
| Magnesium oxide | 41 |
| Calcium oxide | 27 |
| Strontium oxide | 21 |

Other substances such as $Al_2O_3$ may also be present in readily detectable amounts in these glasses without materially impairing the properties of products made from them. Preferably, however, the amount of "inert" impurities will not exceed five mole percent of the glass composition.

These glasses, as the data represented by the accompanying charts illustrate, have in common the important property of alkali metal ion immobility. The strong tendency for these ions to move in response to the application of an electrical potential is offset by the alkaline earth ions of these glasses and since the alkaline earth ions themselves do not move under such condition, these glasses have high resistivity values, there being no effective current-conducting means within the glass bodies or masses.

In will be understood that throughout this specification and in the appended claims, whatever amounts, proportions, ratios or percentages are stated, reference is made to the weight basis rather than to the volume basis, and mole percent is employed for convenience to express weight relationships of reagents and constituents.

Having thus described this invention in such full, clear, concise and exact terms as to enable any person skilled in the art to which it pertains to make and use the same, and having set forth the best mode contemplated of carrying out this invention, I state that the subject matter which I regard as being my invention is particularly pointed out and distinctly claimed in what is claimed, it being understood that equivalents or modifications of, or substitutions for, parts of the specifically described embodiments of the invention may be made without departing from the scope of the invention as set forth in what is claimed.

What I claim as new and desire to secure by Letters Patent of the United States is:

1. In the method of making a glass sheet having special utility in electrical insulating applications including the steps of forming a glass bubble and then shaping a portion of the glass bubble to predetermined form and thickness between one-half mil and one-half inch, the combination of the preliminary step of providing as the glass to be used in the formation of the glass bubble a glass having room-temperature resistivity of at least $10^{-18}$ ohm centimeters consisting of about 40 mole percent calcium oxide and about 60 mole percent silica and containing sodium in an amount at least 10 times greater than the sodium content of fused silica having resistivity less than that of said glass over the temperature range of 300 to 500° C.

2. In the method of making a glass sheet having special utility in electrical insulating applications including the step of forming a glass body of desired shape and dimensions, the combination of the preliminary step of providing as the glass to be used in the formation of the said body a glass having room-temperature resistivity of at least $10^{-18}$ ohm centimeters consisting of from 30 to 60 mole percent of an oxide selected from the group consisting of calcium oxide, barium oxide, strontium oxide, magnesium oxide and mixtures thereof, and from 70 to 40 mole percent, respectively, of an oxide selected from the group consisting of $P_2O_5$, $GeO_2$ and $SiO_2$ and containing sodium in an amount at least 10 times greater than the sodium content of fused silica having resistivity less than that of said glass over the temperature range of 300 to 550° C.

References Cited by the Examiner

UNITED STATES PATENTS

| | | | |
|---|---|---|---|
| 2,457,785 | 12/1948 | Slayter et al. | 65—187 |
| 2,580,662 | 1/1952 | Danzin. | |
| 2,780,889 | 2/1957 | Fulk | 65—21 |
| 2,910,805 | 11/1959 | Muller et al. | 65—187 |

OTHER REFERENCES

"Ceramic Age," May 1949, pages 260 to 265, entitled "Invitation to Glass Technology," by Alexis G. Pincus.

DONALL N. SYLVESTER, *Primary Examiner.*

F. W. MIGA, *Assistant Examiner.*